United States Patent [19]

Imanaga

[11] Patent Number: 4,744,705
[45] Date of Patent: May 17, 1988

[54] TWIST DRILL BIT

[75] Inventor: Koujirou Imanaga, Gifu, Japan

[73] Assignee: Mitsubishi Kinzoku Kabushiki Kaisha, Tokyo, Japan

[21] Appl. No.: 895,177

[22] Filed: Aug. 11, 1986

[30] Foreign Application Priority Data

Jun. 23, 1986 [JP] Japan .................. 61-95820[U]

[51] Int. Cl.$^4$ ............................................. B23B 51/02
[52] U.S. Cl. ................................... 408/230; 408/145
[58] Field of Search ............... 408/144, 145, 227, 230; 407/119

[56] References Cited

U.S. PATENT DOCUMENTS 61,208  1/1867  Kasson ................................. 408/230

FOREIGN PATENT DOCUMENTS

| 85240 | 8/1983 | European Pat. Off. | ............ 408/144 |
| 132652 | 2/1985 | European Pat. Off. | ............ 408/145 |
| 2521938 | 11/1975 | Fed. Rep. of Germany | ...... 408/230 |
| 72587 | 6/1979 | Japan | ................................. 407/119 |
| 21711 | 2/1981 | Japan | ................................. 408/144 |
| 84/00910 | 3/1984 | PCT Int'l Appl. | ................ 408/230 |
| 1419624 | 12/1975 | United Kingdom | ................ 408/230 |
| 622588 | 9/1978 | U.S.S.R. | ........................... 408/230 |

*Primary Examiner*—Gil Weidenfeld
*Assistant Examiner*—Daniel W. Howell
*Attorney, Agent, or Firm*—Scully, Scott, Murphy & Presser

[57] ABSTRACT

A twist drill bit includes a cylindrical body having a pair of spiral grooves formed in an outer peripheral surface of the body and extending spirally along a length thereof to a forward end of the body. Each of the grooves has a forward portion defined by a first surface which is concavely arcuate when viewed from the forward end and extends from the outer periphery of the body generally radially inwardly thereof and a second surface which is convexly arcuate when viewed from the forward end and extends from an inner end of the first surface to the outer periphery of the body. Each of the first surfaces serves as a rake surface which terminates at the forward end in a cutting edge which is concavely curved when viewed from the forward end. Each of the cutting edges is coated with a hard coating which is harder than the body. The body has a web thickness of 0.25 D to 0.5 D wherein D is a diameter of said body, and the first surface has a radius of curvature of 0.20 D to 0.30 D while the second surface has a radius of curvature of 0.25 D to 0.40 D.

4 Claims, 6 Drawing Sheets

FIG. 10

| No. of holes | surface roughness | over size (μ) | |
|---|---|---|---|
| | | entrance | exit |
| 1st hole | | X: 15　Y: 12 | 11　13 |
| 20th hole | | X: 8　Y: 10 | 13　13 |
| 40th hole | | X: 10　Y: 11 | 9　11 |
| 60th hole | | X: 8　Y: 10 | 11　12 |
| 80th hole | | X: 11　Y: 9 | 13　12 |
| 100th hole | | X: 10　Y: 11 | 12　11 |

TWIST DRILL BIT

BACKGROUND OF THE INVENTION

1. Field of the Invention

This invention relates to a twist drill bit having a pair of cutting edges at a forward end thereof.

2. Prior Art

One conventional twist drill bit 10 shown in FIG. 1 has a cylindrical body 12, and a pair of spiral grooves or flutes 14 formed in the outer peripheral surface of the body 12, the grooves 14 serving to discharge cuttings or chips therethrough during a drilling operation. Each of the spiral grooves 14 has a forward end portion which is defined by a substantially straight rake surface 16 extending radially inwardly from the outer periphery of the bit body 12, and a concavely-curved surface 18 having a relatively large radius of curvature and extending from the inner end of the rake surface 16 to the outer periphery of the bit body 12, as seen in FIG. 1. Each rake surface 16 terminates at its forward end in a cutting edge the outer end of which is designated at 20.

FIG. 2 shows another conventional twist drill bit 10a in which a forward end portion of each of spiral groove 14a has a rake surface 16a similar to the rake surface 16 of the drill bit 10 of FIG. 1, and a concavely-curved surface 18a having a relatively small radius of curvature and extending from the inner end of the rake surface 16a toward the outer periphery of the bit body 12a.

FIG. 3 shows a further conventional twist drill bit 10b in which a forward end portion of each of spiral grooves 14b is defined by a rake surface 16b extending radially inwardly from the outer periphery of the bit body 12b and curving concavely gently and a concavely-curved surface 18b having a relatively small radius of curvature and extending from the inner end of the rake surface 16b to the outer periphery of the bit body 12b.

FIG. 4 shows a still further conventional twist drill bit 10c in which a forward end portion of each of spiral grooves 14c has a convex rake surface 16c extending from the outer periphery of the bit body 12c and curving convexly gently and a concavely-curved surface 18c having a relatively large radius of curvature extending to the outer periphery of the bit body 12c.

FIG. 5 shows a further conventional twist drill bit 10d in which a forward end portion of each of spiral grooves 14d is defined by a convex rake surface 16d and a concavely-curved surface 18d extending from the inner end of the rake surface 16d to the outer periphery of the bit body 12d, the convex rake surface 16d being defined by a first straight outer surface 16e extending from the outer periphery of the bit body and a generally straight inner surface 16f extending between the outer surface 16e and the curved surface 18d.

Although not shown in the drawings, in the conventional drill bit 10 of FIG. 1, a projection is formed on each of the rake surface 16 so as to serve as a chip breaker for breaking a chip or cutting, cut by the cutting edges from a workpiece, into pieces to facilitate the discharge of the chips through the spiral grooves 14.

On the other hand, in the conventional drill bit 10a of FIG. 2, a chip or cutting is extended along the rake surface 16a and is abruptly curved or bent by the concavely-curved surface 18a, so that the chip is divided into pieces, thereby facilitating the discharge of the chip. Similarly, in the conventional drill bit 10b of FIG. 3, a chip or cutting is extended along the rake surface 16b and is abruptly curved or bent by the concavely-curved surface 18b, so that the chip is divided into pieces.

In the conventional drill bit 10c of FIG. 4, although not shown in the drawings, each rake surface 16c is ground off at its forward end portion, so that each rake surface 16c is stepped or offset inwardly to provide a flat portion disposed along the axis of the bit body 12c and extending to the cutting edge, so that the stepped portion serves as a chip breaker. The conventional drill bit 10d of FIG. 5 has a chip breaker similar to that of the drill bit 10c of FIG. 4.

Recently, it has been desired to operate drills at high speeds to enhance drilling efficiency. To meet such requirements, solid-type drills made of cemented carbide have been extensively used. However, such solid-type drills of cemented carbide have the disadvantage that they have a lower resistance to breakage. Therefore, if the conventional drill 10 of FIG. 1 is designed as a solid-type and is made of cemented carbide, there is a possibility that the drill will be broken during a high-speed drilling operation in which an increased cutting resistance is encountered, since such a drill has a relatively small web thickness and hence a lowered rigidity. If the web thickness is increased to prevent such a drill breakage, then the spiral grooves 14 becomes so small in size that the chip breaker can not be provided on the rake surface 16.

As regards the conventional drill bits 10a and 10b of FIGS. 2 and 3, it is rather difficult that these drill bits are made of cemented carbide due to their configuration. In addition, the rake surfaces 16a and 16b are generally flat, so that the web thickness is rather small. Therefore, even if these drill bits are made of cemented carbide, the rigidity of the drill bits are reduced as described above for the drill bit 10 of FIG. 1.

The conventional drill bits 10c and 10d of FIGS. 4 and 5 can have a greater web thickness as compared with the conventional drill bits 10, 10a and 10b of FIGS. 1, 2 and 3. However, the cutting edges have a negative rake angle, and therefore an increased cutting resistance is encountered during the drilling operation. In addition, if these drills 10c and 10d are made of cemented carbide which is hard, much time and labor are required to grind off the the forward end portion of the rake surface 16c, 16d to provide the stepped portion serving as the chip breaker.

SUMMARY OF THE INVENTION

It is therefore an object of this invention to provide a twist drill bit with a pair of spiral grooves which ensures a smooth discharge of chips through the grooves during the drilling operation and has an increased rigidity.

According to the present invention, there is provided a twist drill bit comprising a cylindrical body having a forward end and having a pair of spiral grooves formed in an outer peripheral surface of said body and extending spirally along a length thereof to said forward end, each of said grooves having a forward portion defined by a first surface which is concavely arcuate when viewed from said forward end and extends from the outer periphery of said body generally radially inwardly thereof and a second surface which is convexly arcuate when viewed from said forward end and extends from an inner end of said first surface to the outer periphery of said body, each of said first surfaces serves as a rake surface which terminates at said forward end in a cutting edge which is concavely curved when viewed from said forward end, each of said cutting edges being coated with a hard coating said coating being harder than said edges upon which said hard coating is applied, said body having a web thickness of 0.25 D to 0.5 D wherein D is a diameter of said body, and said first surface having a radius of curvature of 0.20 D to 0.30 D while said second surface has a radius of curvature of 0.25 D to 0.40 D.

BRIEF DESCRIPTION OF THE DRAWINGS

FIG. 10 is an diagrammatical illustration showing a surface roughness and over size of 100 holes sequentially formed by the test drill bit.

DESCRIPTION OF THE PREFERRED EMBODIMENT OF THE INVENTION

Figures 1, 2, 3, 4, 5:
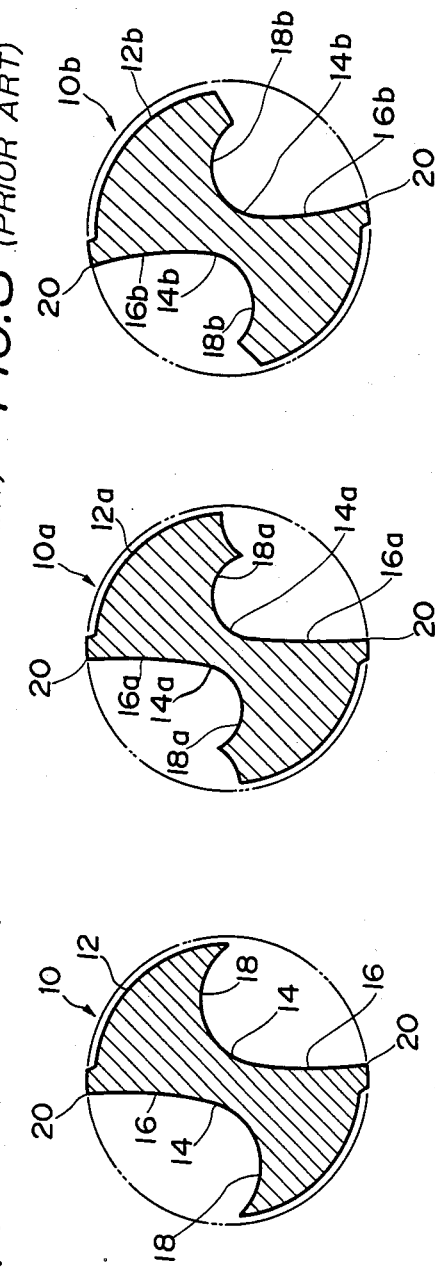
FIGS. 1 to 5 are cross-sectional views of conventional twist drill bits of different types, respectively.
Figure 6:
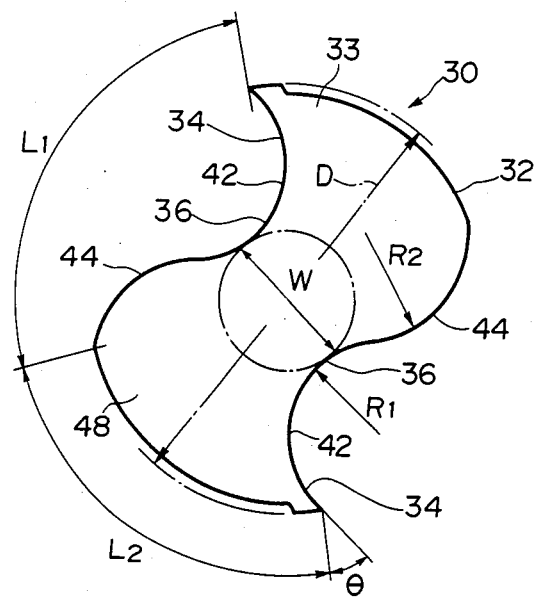
FIG. 6 is a front end view of a twist drill bit provided in accordance with the present invention.
Figure 7:
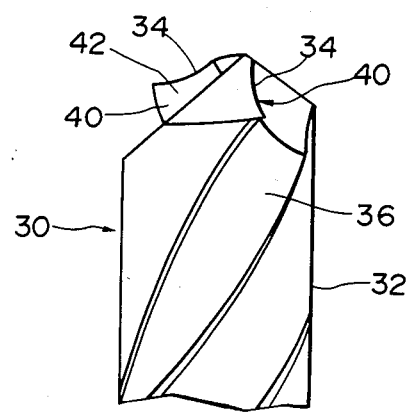
FIG. 7 is a side-elevational view of a portion of the drill bit of FIG. 6.

A twist drill bit 30 of the solid type shown in FIGS. 6 and 7 includes a cylindrical body 32 of cemented carbide having a pair of concavely-curved cutting edges 34 at a forward end 33 thereof. The body 30 has a pair of spiral grooves or flutes 36 formed in an outer peripheral surface thereof and extending spirally therealong up to a forward end 33.

In order to increase the rigidity of the bit body 32 and particularly a torsional rigidity thereof, the bit body 32 has a web thickness W of 0.25 D to 0.5 D wherein D is a diameter of the bit body 32. In the case where the web of the bit body 32 is tapered along the length of the bit body 32, with the bit body 32 correspondingly tapered, the web thickness W has the above value at any point throughout the length of the web.

However, generally, as described above, when a web thickness is increased, the depth of the spiral grooves 36 becomes unduly shallow, so that chips or cuttings produced from a workpiece tend to become jammed in a forward end portion of the spiral grooves, thereby adversely affecting a smooth discharge of the chips through the spiral grooves.

A forward end portion 40 of each spiral groove 36 has a unique configuration so as to overcome this difficulty. More specifically, the forward end portion 40 of each spiral groove 36 is defined by a first surface 42 which is concavely arcuate when viewed from the forward end 33 of the bit body 32 and extends from the outer periphery of the bit body 32 generally radially inwardly, and a second surface 44 which is convexly arcuate when viewed from the forward end 33 and extends from the inner end of the concave surface 42 to the outer periphery of the bit body 32, as seen in FIG. 6. Each of the concavely arcuate surfaces 42 serves as a rake surface which terminates at its forward end in a respective one of the concavely-curved cutting edges 34.

The radius R1 of curvature of the concavely-arcuate rake surface 42 should be in the range of between 0.20 D and 0.30 D wherein D is the diameter of the bit body 32. It is most preferred that the radius R1 is 0.20 D to 0.22 D and that a radial rake angle $\theta$ of each cutting edges 34 at its outer end portion is in the range of between 10° and 30°. If the radius R1 is less than 0.20 D, the radial rake angle $\theta$ becomes too positive, so that the cutting edge 34 has a lowered strength. On the other hand, if the radius R1 exceeds 0.30 D, the arcuate convex surface 44 is not formed into a desired shape, and in addition a chip from the workpiece can not be curled along the rake surface 42 to a satisfactory degree, as later described.

Also, the radius R2 of curvature of the convexly arcuate surface 44 should be in the range of between 0.25 D and 0.40 D, and it is most preferred that the radius R2 is about 0.30 D. If the radius R2 is less than 0.25 D, the ratio of the grooves 36 to the bit body 32 in cross-sectional area is unduly increased to lower the rigidity of the bit body 32. On the other hand, if the radius R2 exceeds 0.40 D, chips or cuttings produced from a workpiece can not be broken efficiently.

Each of the cutting edges 34 is coated with a hard coating which is harder than the bit body 32 of cemented carbide. This hard coating is composed of at least one material selected from the group consisting of TiN, TiC, TiCN and $Al_2O_3$.

During the drilling operation using the drill bit 30, each of the concavely-curved cutting edges 34 cuts curved chips of a corresponding shape from a workpiece. The chip is first extended along the concavely arcuate rake surface 42 and then impinges on the convexly arcuate surface 44 so that the chip is curled, the curled chip having a relatively small radius of curvature. Since the chip is curved from the beginning when it is cut from the workpiece, a greater internal stress develops in the chip when it is curled, as compared with a chip of a generally flat shape. Thanks to such an internal stress, the chip is broken into small pieces.

As described above, since the bit body 32 has the web thickness of 0.25 D to 0.5 D, the bit body 32 has an increased torsional rigidity as well as an increased bending rigidity. As a result, a hole is drilled by the drill bit 30 with a high dimensional accuracy.

In addition, a chip produced by the concavely-curved cutting edge 34 is guided along the concavely arcuate rake surface 42 and then is caused to impinge on the convexly arcuate surface 44 so as to be broken into pieces. Therefore, the chip thus broken is smoothly discharged through the spiral groove 36, and the jamming of the chip in the spiral groove 36 is positively prevented. Further, since the chip is broken into small pieces, the ratio of the width L1 of the groove 36 to the width L2 of a land 48 in a circumferential direction of the bit body 32 can be reduced in comparison with that of a conventional drill. This further increases the rigidity of the bit body 32. In this embodiment, the ratio of L1 to L2 is 0.8 to 1.3.

Further, since the rake surface 42 has a concavely arcuate shape, the radial rake angle $\theta$ of the cutting edge 34 at the outer peripheral portion of the bit body 32 can be made positive. As a result, the cutting resistance exerted on the cutting edge 34 can be reduced. In addition, since the hard coating which is harder than the bit body 32 of cemented carbide is applied to each cutting edge 34, a wear resistance of the cutting edge 34 is increased markedly.

With the above construction, even if the bit body 32 is made of cemented carbide, the drill bit 30 can operate at high speeds to drill a hole in a workpiece to achieve a high drilling efficiency.

Even if the bit body 30 is made of high speed steel, similar results can be achieved as described above.

The invention will now be described by way of the following drilling tests:

DRILLING TESTS

Test drill bits made of cemented carbide and having the same shape as the drill bit 30 of FIGS. 6 and 7 were prepared. For reasons of convenience, the reference characters for the drill bit 30 are used here to designate the corresponding parts of the test drill bit. The test drill bit had a diameter D of 12 mm and a web thickness W of 0.3 D, and the radius R1 of curvature of a concavely arcuate rake surface 42 was 2.6 mm, and a radius of curvature of a convexly arcuate surface 44 was 3.6 mm. The drilling tests were conducted under the following conditions:

Cutting speed V (m/min.): 40, 50 and 60
Feed rate f (mm/rev.): 0.15, 0.20. 0.25 and 0.30
Workpiece: steel (AISI 1042)

The cutting speed was a peripheral speed of the cutting edge at the outer end thereof. Holes formed through workpieces during the drilling tests had a length or depth of 12 mm.

Figure 8:
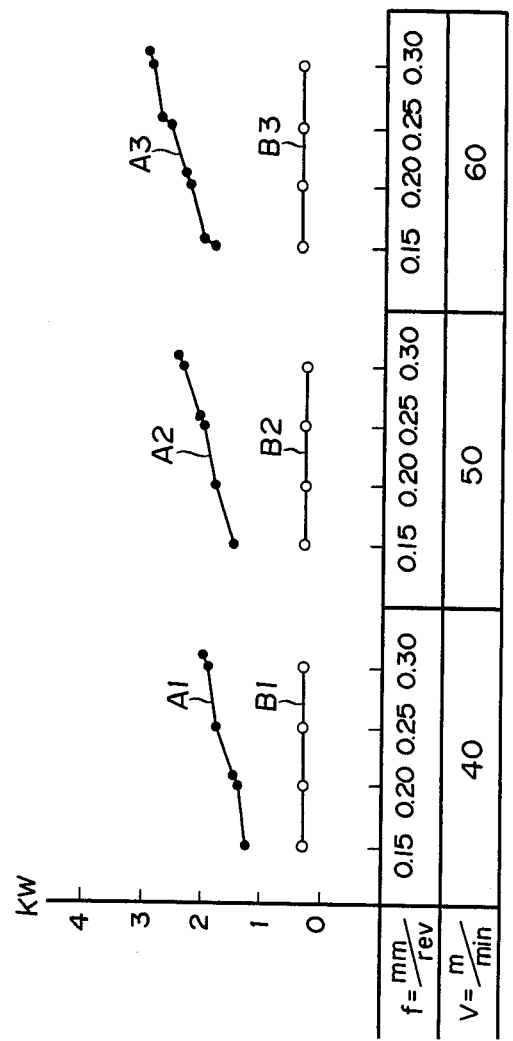
FIG. 8 is a graph showing cutting load exerted on a test drill bit, similar to the drill bit of FIG. 6, during a drilling test.

FIG. 8 is a graph showing load exerted on the test drill bit during the drilling tests. Lines A1, A2 and A2 indicate power (KW) consumed for the drilling operation while lines B1, B2 and B3 indicate power consumed when the test drill bit was under no load.

Figure 9:
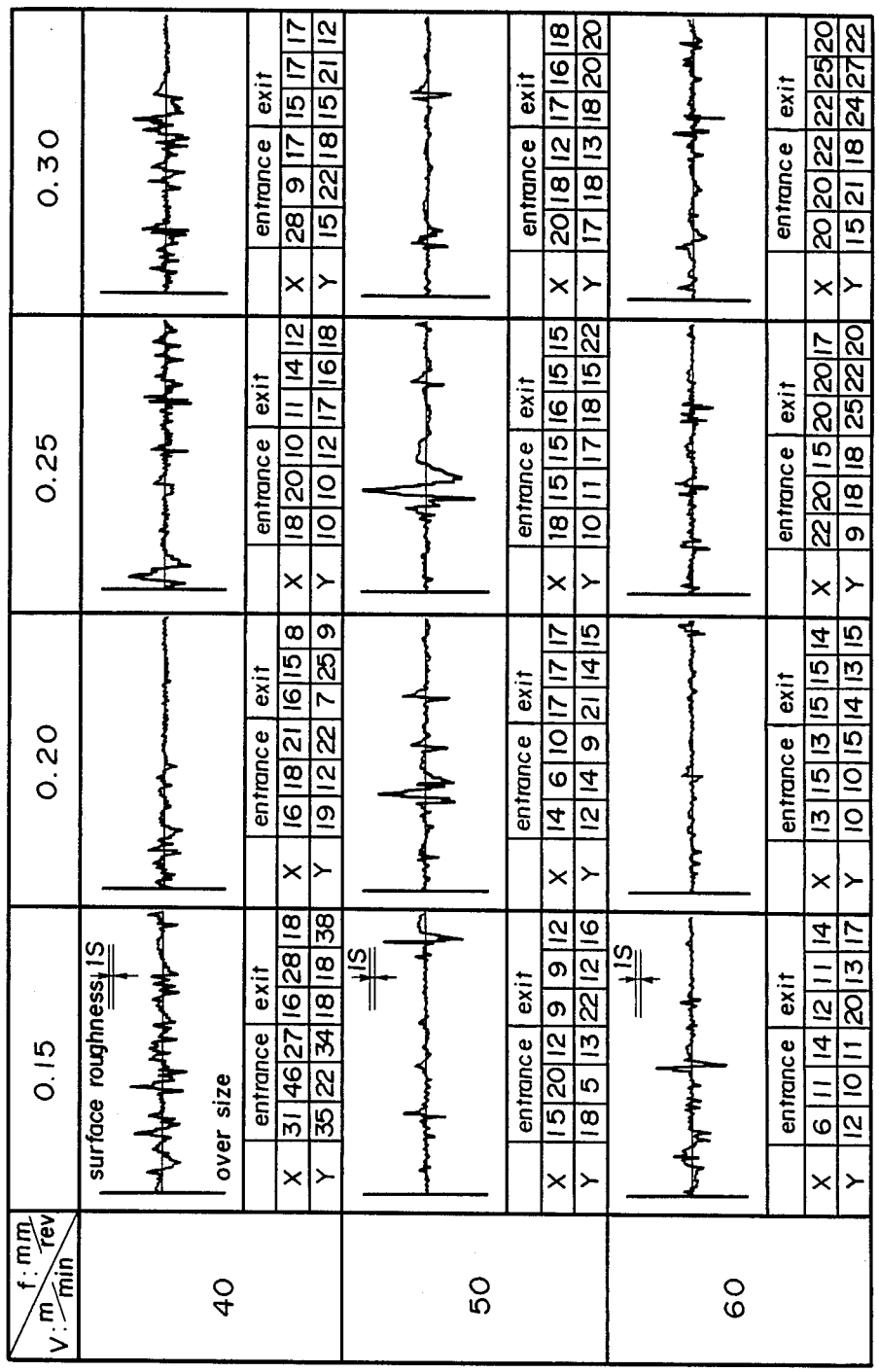
FIG. 9 is a diagrammatical illustration showing a surface roughness and over size of holes drilled by the test drill bit.

FIG. 9 is a diagrammatical illustration showing a surface roughness of the drilled holes and an over size or enlargement of the drilled holes which is a deviation from the intended diameter. Three holes were formed under each of the cutting conditions. The diameter of the drilled holes was measured at an entrance and exit of each drilled hole, and also was measured along two lines X and Y, disposed perpendicular to each other, at each of the entrance and exit. The surface roughness and the over size are indicated in FIG. 9 in terms of $\mu m$.

FIG. 10 is an diagrammatical illustration showing a surface roughness and over size of 100 holes sequentially formed at a cutting speed V of 60 m/min. at a feed rate of 0.2 mm/rev.

Figure 11:
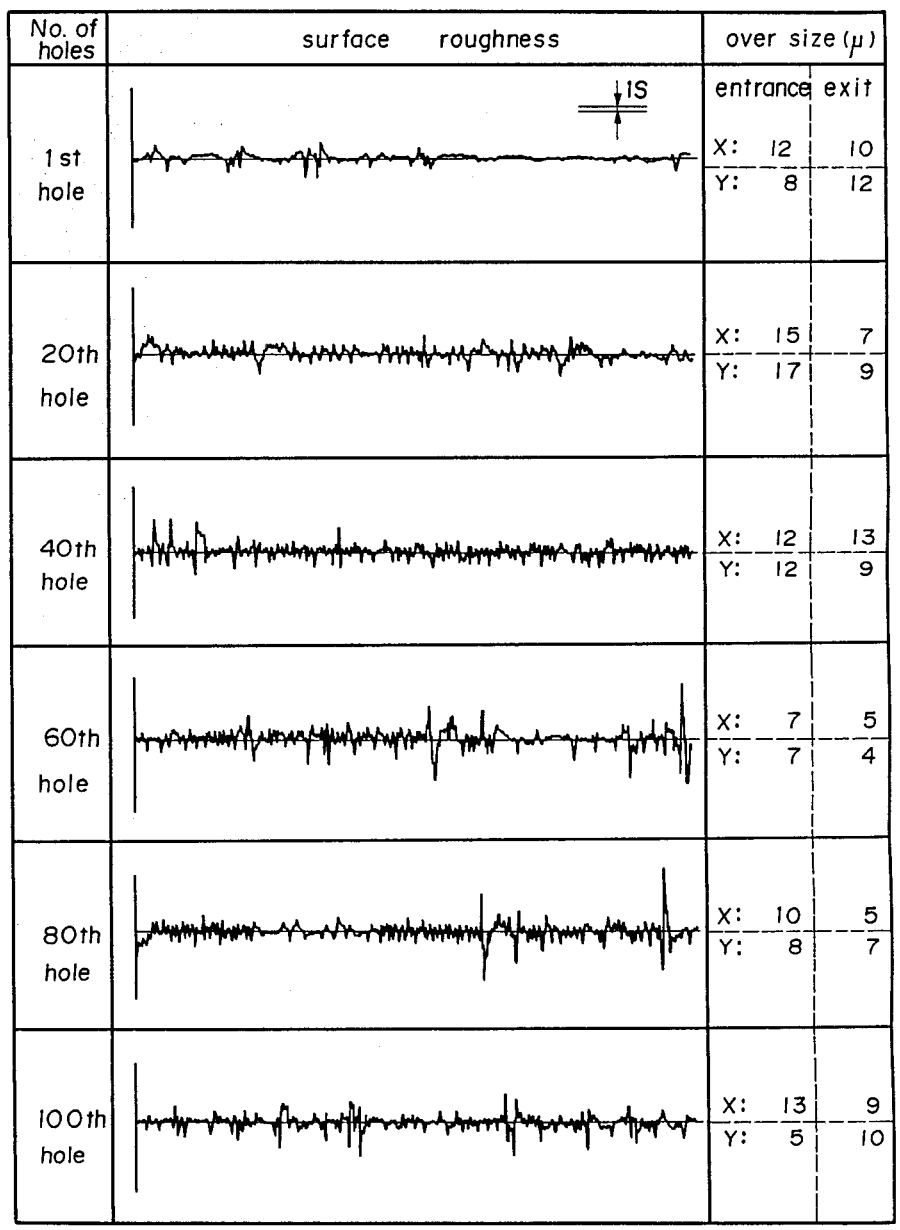
FIG. 11 is an diagrammatical illustration similar to FIG. 10 but showing the results achieved by the test drill bit having its cutting edges reground or sharpened.

FIG. 11 is an diagrammatical illustration similar to FIG. 10 but showing the results achieved by the test drill bit having its cutting edges 34 reground or sharpened. The cutting conditions were the same as the drilling operation of FIG. 10.

Each of the test drill bits could drill more than 100 holes.

A conventional twist drill bit of high speed steel could not form a hole satisfactorily under the above cutting conditions. Even under the optimum cutting conditions for such a conventional drill bit (i.e., cutting speed: 10 to 20 m/min; feed rate: 0.05 to 0.15 mm/rev.), an over size of the drilled hole was more than 50 $\mu m$, and a surface roughness of the drilled hole was more than 100 $\mu m$.

What is claimed is:

1. A twist drill bit comprising a cylindrical body having a forward end which contacts a workpiece and having a pair of spiral grooves formed in an outer peripheral surface of said body and extending spirally along a length thereof to said forward end, each of said grooves having a forward portion defined by a first surface which is concavely arcuate when viewed from said forward end and extends from the outer periphery of said body generally radially inwardly thereof and a second surface which is convexly arcuate when viewed from said forward end and extends from an inner end of said first surface to the outer periphery of said body, each of said first surfaces serves as a rake surface which terminates at said forward end in a cutting edge which is concavely curved when viewed from said forward end, each of said cutting edges being coated with a hard coating, said coating being harder than said edges upon which said hard coating is applied, said body having a web thickness of 0.25 D to 0.5 D wherein D is a diameter of said body, and said first surface having a radius of curvature of 0.20 D to 0.30 D while said second surface has a radius of curvature of 0.25 D to 0.40 D, and wherein said bit body has at said forward end a land disposed between said pair of spiral grooves, the ration of a width of said spiral groove to a width of said land in a circumferential direction of said bit body is 0.8 to 1.3.

2. A drill bit according to claim 1, in which said body is of the solid type and is made of cemented carbide.

3. A drill bit according to claim 1, in which the radius of curvature of said first surface is 0.20 D to 0.22 D, each of said cutting edges having a radial rake angle of 10° to 30° at an outer portion thereof, and the radius of curvature of said second surface being about 0.30 D.

4. A drill bit according to claim 1, in which said hard coating is composed of at least one material selected from the group consisting of TiN, TiC, TiCN and Al$_2$O$_3$.

* * * * *